US012656969B1

(12) United States Patent
Sharma et al.

(10) Patent No.: US 12,656,969 B1
(45) Date of Patent: Jun. 16, 2026

(54) SELECTING MEMORY BLOCKS FOR RELOCATION OPERATIONS BASED ON COMMIT TIME

(71) Applicant: Sandisk Technologies, Inc., Milpitas, CA (US)

(72) Inventors: Amit Sharma, Bengalore (IN); Abhinandan Venugopal, Bengalore (IN); Arun Kannan, Bengalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 19/051,710

(22) Filed: Feb. 12, 2025

(51) Int. Cl.
*G06F 3/06* (2006.01)
*G06F 21/54* (2013.01)

(52) U.S. Cl.
CPC ............ *G06F 3/064* (2013.01); *G06F 3/0647* (2013.01); *G06F 3/0679* (2013.01); *G06F 21/54* (2013.01)

(58) Field of Classification Search
CPC ...... G06F 3/064; G06F 3/0647; G06F 3/0679; G06F 21/54
See application file for complete search history.

(56) References Cited

U.S. PATENT DOCUMENTS

| | | | | |
|---|---|---|---|---|
| 2016/0011815 A1* | 1/2016 | Klein | .................... | G06F 3/0616 |
| | | | | 714/6.12 |
| 2020/0065240 A1* | 2/2020 | Choi | ..................... | G06F 3/0604 |
| 2024/0329865 A1* | 10/2024 | Thirumalai | ............. | G06F 3/065 |
| 2024/0411688 A1* | 12/2024 | Choudhary | ......... | G06F 12/0253 |

* cited by examiner

*Primary Examiner* — Kevin Verbrugge
(74) *Attorney, Agent, or Firm* — Dentons Durham Jones Pinegar

(57) ABSTRACT

A data storage device includes a relocation analysis system that tracks and/or calculates a commit time associated with one or more memory blocks. When a relocation operation is to be performed, the relocation analysis system selects one or more memory blocks from a pool of memory blocks based on the commit time. The relocation analysis system also determines a validity count associated each memory block in the pool of memory blocks. The validity count of each memory block, along with the commit time of each memory block, may also be used to select one or more memory blocks that will be part of the relocation operation. When the one or more memory blocks have been selected, the relocation analysis system causes the relocation operation to be performed on the one or more memory blocks.

20 Claims, 6 Drawing Sheets

SELECTING MEMORY BLOCKS FOR RELOCATION OPERATIONS BASED ON COMMIT TIME

BACKGROUND

Data storage devices, such as NAND data storage devices, periodically initiate and/or perform one or more relocation operations. In a relocation operation, valid data from one or more source memory blocks is moved to one or more destination memory blocks. Typically, memory blocks that are selected for the relocation operation have lower validity counts (e.g., a number of valid pages in the memory block) when compared with other memory blocks. A lower validity count means fewer pages need to be moved from the source memory block to the destination memory block, which typically improves the efficiency of the relocation operation.

However, there are situations in which memory blocks having a low validity count have higher commit times. A commit time is an amount of time required to update one or more global address table (GAT) entries associated with the new location of the data. The GAT is used by a flash translation layer (FTL) of the data storage device to map logical addresses of the data to physical locations. Thus, as data is moved from the source memory block to the destination memory block, the GAT entries are updated. If a high number of GAT entries need to be updated, host writes associated with the relocation operation could be delayed, which would negatively impact the efficiency of the relocation operation and the performance of the data storage device.

Accordingly, it would be beneficial to use factors other than a validity count when determining which memory blocks should be selected for a relocation operation.

SUMMARY

The present disclosure describes a data storage device, such as a NAND data storage device, having a relocation analysis system. In an example, the relocation analysis system tracks and/or calculates a commit time associated with one or more memory blocks that may be, will be or are selected for a relocation operation. For example, the relocation analysis system identifies a pool of memory blocks that may undergo or otherwise be selected for a relocation operation. The relocation analysis system determines a commit time associated with each of the memory blocks in the pool of memory blocks. The relocation analysis system then selects one or more memory blocks from the pool of memory blocks having the lowest commit times. The relocation analysis system also initiates a relocation operation on the selected memory blocks.

In an example, the relocation analysis system also determines a validity count associated each memory block in the pool of memory blocks. The validity count of each memory block, along with the commit time of each memory block, may also be used to select the memory blocks that will be part of the relocation operation.

Accordingly, examples of the present disclosure describe a method that includes initiating a relocation operation in a data storage device. In an example, the relocation operation is initiated by a relocation analysis system that identifies a plurality of memory blocks for the relocation operation. Based, at least in part, on the plurality of memory blocks being identified, the relocation analysis system determines a commit time associated with each memory block of the plurality of memory blocks. The relocation analysis system also selects at least one memory block of the plurality of memory blocks based, at least in part, on the commit time associated with the at least one memory block. The relocation operation is then performed using the at least one memory block.

Examples also describe a data storage device having a controller and a relocation analysis system associated with the controller. In an example, the relocation analysis system is operable to identify of pool of memory blocks for a relocation operation and determine a commit time associated with each memory block in the pool of memory blocks. The relocation analysis system also determines a validity count associated with each memory block in the pool of memory blocks. The relocation analysis system selects at least one memory block in the pool of memory blocks for the relocation operation based, at least in part, on the commit time associated with the at least one memory block and the validity count associated with the at least one memory block. The relocation analysis system also causes the relocation operation to be performed.

Still other examples describe a data storage device that includes means for identifying a pool of memory blocks for a relocation operation and means for determining a commit time associated with each memory block in the pool of memory blocks. The data storage device also includes means for selecting at least one memory block in the pool of memory blocks based, at least in part, on the commit time associated with the at least one memory block. The data storage device also includes means for performing the relocation operation using the at least one memory block.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
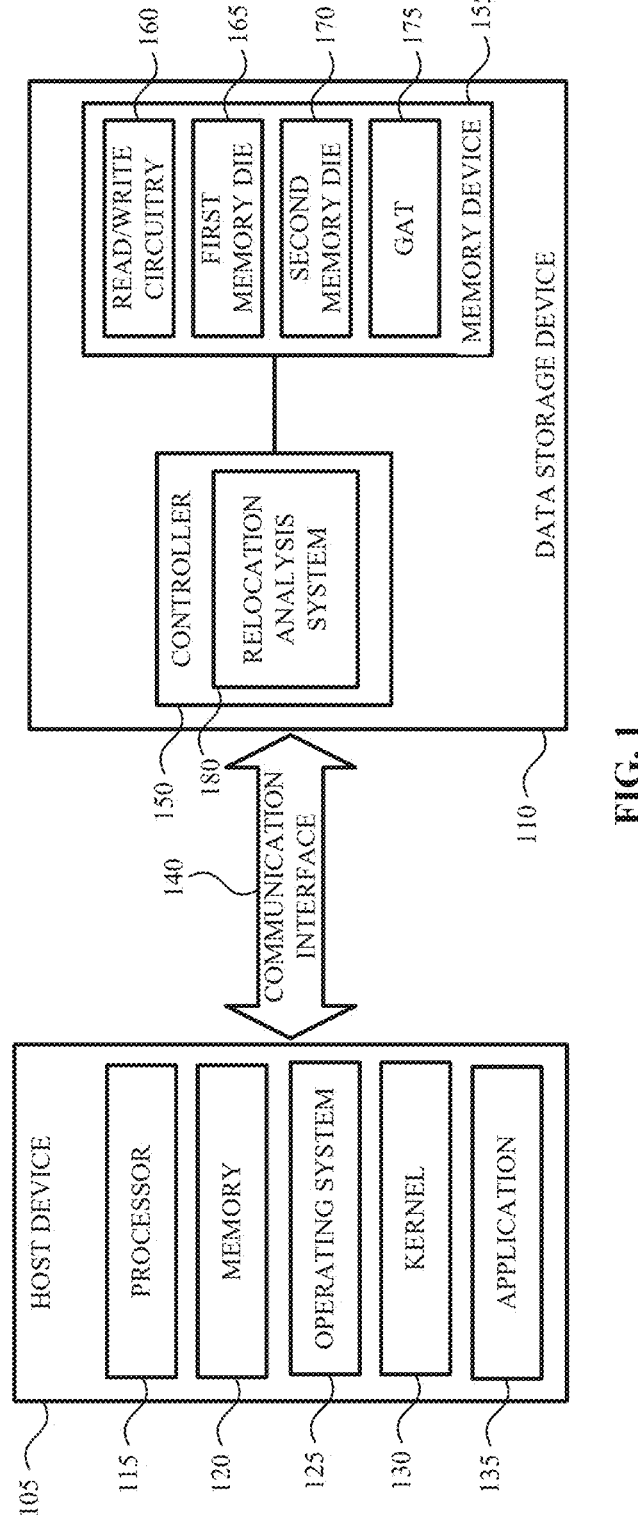
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

As previously described, relocation operations are periodically performed on data storage devices. In a relocation operation, valid data from one or more source memory blocks is moved to one or more destination memory blocks. Typically, memory blocks are selected for relocation operations based on a validity count. A validity count is a number of valid pages in the memory block. Thus, memory blocks with lower validity counts are typically selected for relocation operations because fewer pages need to be moved from the source memory block to the destination memory block.

However, there are situations in which a validity count should not be the only factor in determining which memory blocks should be selected for a relocation operation. For example, relocation operations typically have two phases—a read/write phase and a commit phase. In the read/write phase, data is read from a source memory block and written to a destination or target memory block. In the commit phase, a global address table (GAT) associated with the data is updated. During the commit phase, GAT deltas are added to a GAT delta queue (e.g., a uLayer). However, if GAT delta queue is about to become full, entries are evicted to the NAND.

The GAT is used by a flash translation layer (FTL) of the data storage device to map logical addresses of the data to physical locations in the data storage device. Thus, as data is written to the destination memory block, one or more GAT entries associated with the new location of the data is updated. The amount of time it takes to complete the commit phase (referred to herein as the "commit time") depends, at least in part, on the entries that are being added to the delta queue. For example, if entries being added belong to different GAT pages (e.g., mSets), GAT delta queue evictions would be inefficient as there would be few entries that belong to same GAT page. As a result, evicting entries would take a significant amount of time. In some examples, the commit time may be higher than an amount of time it takes for the read/write phase of the relocation operation to be completed. This could delay the relocation operation which would negatively impact the efficiency of the relocation operation and the performance of the data storage device.

To address the above, the present disclosure describes a data storage device having a relocation analysis system. The relocation analysis system tracks and/or calculates a commit time associated with one or more memory blocks that may be, will be or are selected for a relocation operation. For example, when a relocation operation is initiated, the relocation analysis system identifies a pool of memory blocks that are candidates for the relocation operation. The relocation analysis system calculates, determines or identifies a commit time associated with each of the memory blocks in the pool of memory blocks. The relocation analysis system then selects one or more memory blocks from the pool of memory blocks having the lowest commit time. The relocation analysis system also performs the relocation operation using the selected memory blocks.

In an example, the relocation analysis system also determines a validity count associated each memory block in the pool of memory blocks. The validity count of each memory block, along with the commit time of each memory block, may also be used to select the memory blocks that will be part of the relocation operation.

In accordance with the above, many technical benefits may be realized including, but not limited to, increasing the efficiency of relocation operations, helping a data storage device avoid command timeouts, reducing capacity over-provisioning for certain types of data (e.g., video data), and enabling power saving methodologies for various applications (e.g., battery operated computing device applications).

These benefits, along with other examples, will be shown and described in greater detail with respect to FIG. 1-FIG. 7.

FIG. 1 is a block diagram of a system 100 that includes a host device 105 and a data storage device 110 according to an example. In an example, the host device 105 includes a processor 115 and a memory 120 (e.g., main memory). The memory 120 may include or otherwise be associated with an operating system 125, a kernel 130 and/or an application 135.

The processor 115 executes various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 may include a System on a Chip (SoC).

In an example, the memory 120 can be used by the host device 105 to store data. The data that is used, or executed by, the processor 115. Data stored in the memory 120 may include instructions provided by the data storage device 110 via a communication interface 140. The data stored in the memory 120 may also include data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 may create a virtual address space for the application 135 and/or other processes executed by the processor 115. The virtual address space may map to locations in the memory 120. The operating system 125 may also include or otherwise be associated with a kernel 130. The kernel 130 may include instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 includes a controller 150 and a memory device 155. In an example, the controller 150 is communicatively coupled to the memory device 155. The memory device 155 includes one or more memory dies (e.g., first memory die 165 and second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-times programmable, or many-times programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In an example, the data storage device 110 is attached to or embedded within the host device 105. In another example, the data storage device 110 is implemented as an external device or a portable device that can be communicatively or selectively coupled to the host device 105. In yet another example, the data storage device 110 is a component (e.g., a solid-state drive (SSD)) of a network accessible data storage system, a network-attached storage system, a cloud data storage system, or the like.

As previously indicated, the memory device 155 of the data storage device 110 includes a first memory die 165 and a second memory die 170. Although two memory dies are shown, the memory device 155 may include any number of memory dies (e.g., one memory die, two memory dies, eight memory dies, or another number of memory dies).

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

In an example, one or more of the first memory die 165 and the second memory die 170 include one or more planes and each plane may have one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

Figures 2A, 2B:
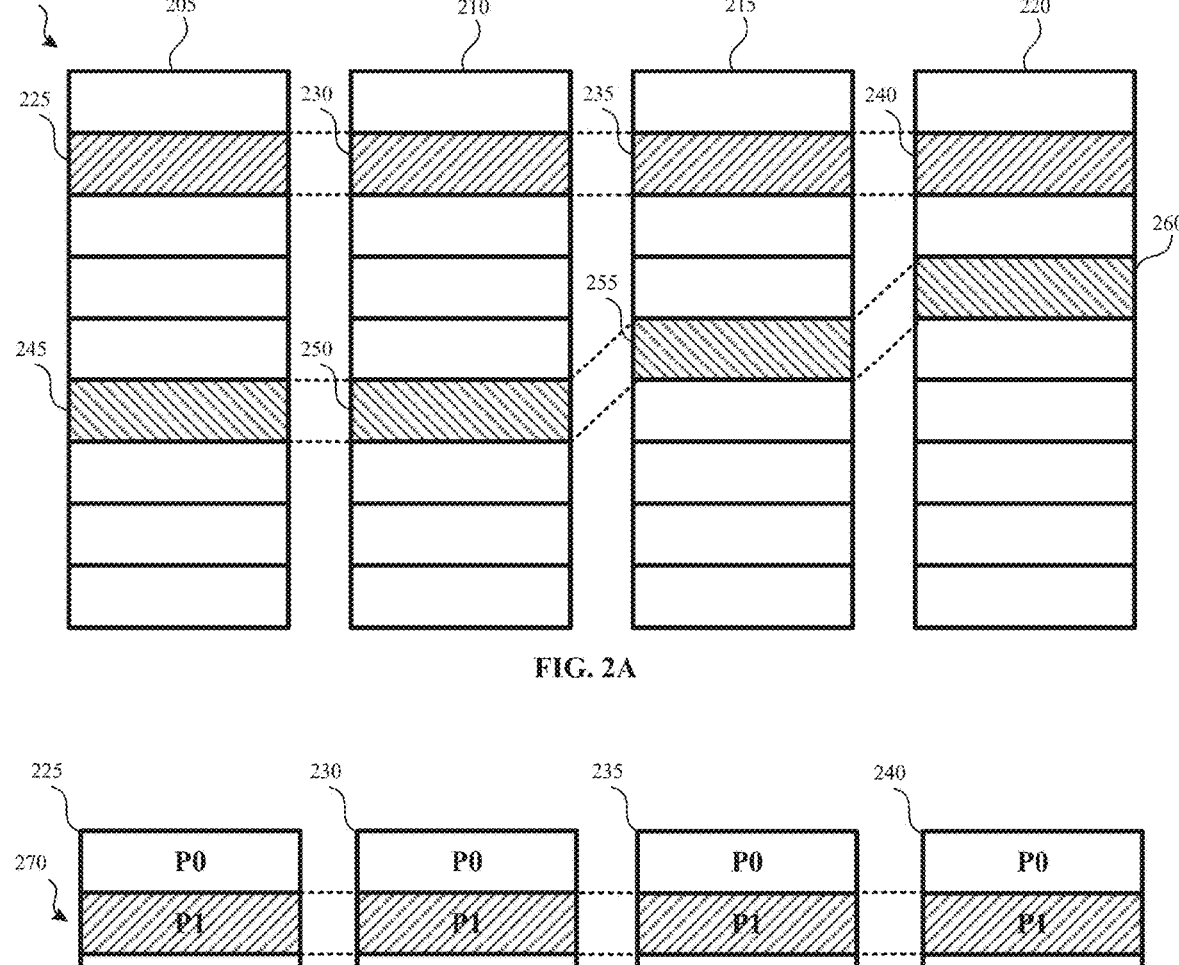
FIG. 2A illustrates how a memory die includes a number of memory blocks according to an example.
FIG. 2B illustrates how a memory block includes one or more pages according to an example.

For example and referring to FIG. 2A, a memory device 200 (e.g., a storage element, a memory die, a non-volatile memory device) includes four planes or sub-arrays (e.g., a first plane 205, a second plane 210, a third plane 215, and a fourth plane 220). In an example, the planes are integrated on a single memory die, are provided on two different memory dies (e.g., two planes on each memory die) or are provided on four separate memory dies. Although four planes are shown and described, the memory device 200 may have any number of planes and/or memory dies.

In an example, the planes are divided into memory blocks consisting of memory cells. As shown in FIG. 2A, the rectangles represent each memory block, such as memory block 225, memory block 230, memory block 235 and memory block 240. There may be dozens or hundreds of memory blocks in each plane of the memory device 200. In an example, each memory block is a unit of erase and is sometimes referred to as an erase block. For example, memory block 225, memory block 230, memory block 235 and memory block 240 include a minimum number of memory cells that are erased together.

In addition, and as previously described, various memory blocks may be logically linked or grouped together (e.g., using a table in or otherwise accessible by the controller 150) to form a metablock. A metablock may be written to, read from and/or erased as a single unit. For example, memory block 225, memory block 230, memory block 235 and memory block 240 may form a first metablock while memory block 245, memory block 250, memory block 255 and memory block 260 may form a second metablock. The memory blocks used to form a metablock need not be restricted to the same relative locations within their respective planes.

In an example, each memory block may be divided, for operational purposes, into pages of memory cells, such as illustrated in FIG. 2B. For example, the memory cells of memory block 225, memory block 230, memory block 235 and memory block 240 are divided into N different pages (shown as P0-PN). Although a specific number of pages are shown in FIG. 2B, a memory block may have any number of pages of memory cells within each memory block.

In an example, a page is a unit of data programming within the memory block. Each page includes the minimum amount of data that can be programmed at one time. The minimum unit of data that can be read at one time may be less than a page. A metapage 270 is illustrated in FIG. 2B as being formed of one physical page from memory block 225, memory block 230, memory block 235 and memory block 240. In the example, shown, the metapage 270 includes page P1 in each of the four memory blocks. However, the pages of the metapage 270 need not have the same relative position within each of the memory blocks. A metapage 270 may be the maximum unit of programming within a memory block.

The memory blocks disclosed in FIG. 2A-FIG. 2B are referred to herein as physical memory blocks because they relate to groups of physical memory cells. As used herein, a logical memory block is a virtual unit of address space defined to have the same size as a physical memory block. Each logical memory block includes a range of logical memory block addresses (LBAs) that are associated with data received from a host. The LBAs are then mapped to one or more physical memory blocks in the data storage device 110 where the data is physically stored. For example and referring back to FIG. 1, this information is stored in a global address table (GAT) 175. Although the GAT 175 is shown as being part of, or stored by, the memory device 155, the GAT 175 may be part of, or stored by the controller 150 and/or part of, or stored by a relocation analysis system 180 associated with the controller 150.

In an example, the data storage device 110 includes a single controller 150. However, in other examples, the data storage device 110 can include multiple controllers. In such an example, a first controller executes a first number and/or type of commands while a second controller executes a second number and/or type of commands. The controllers may operate in parallel and/or independently.

The controller 150 is communicatively coupled to the memory device 155 via a bus, an interface or other communication circuitry. In an example, the communication circuitry may include one or more channels to enable the controller 150 to communicate with the first memory die 165 and/or the second memory die 170 of the memory device 155. In another example, the communication circuitry may include multiple distinct channels which enables the controller 150 to communicate with the first memory die 165 independently and/or in parallel with the second memory die 170 of the memory device 155.

The controller 150 receives data and/or instructions from the host device 105. In an example, the controller 150 can receive one or more read commands, one or more write commands and/or one or more erase commands. In examples, the controller 150 sends data to and/or receives data from the host device 105 via the communication interface 140. The controller 150 also sends data and/or commands to, and/or receive data from, the memory device 155.

For example, the controller 150 sends data and a corresponding write command to the memory device 155 to cause the memory device 155 to store data at a specified address (or a memory die) of the memory device 155. In an example, the write command specifies a physical address of a portion of the memory device 155. For example, when data is received from the host device 105, the data is written sequentially on a targeted memory die (e.g., a metablock of the targeted memory die).

The controller 150 also sends one or more read commands to the memory device 155 and/or one or more erase commands to the memory device 155. In an example, the read command specifies the physical address of a portion of the memory device 155 at which the data is stored.

The controller 150 also sends data and/or commands associated with one or more background scanning operations, garbage collection operations, relocation operations and/or wear leveling operations. The controller 150 also sends one or more read commands to the memory device 155. In an example, the read command specifies the physical address of a portion of the memory device 155 at which the data is stored. The controller 150 may also track the number of program/erase cycles or other programming operations that have been performed on or by the memory device 155 and/or on or by the memory dies of the memory device 155.

The controller 150 also includes, or is otherwise associated with, a relocation analysis system 180. In an example, the relocation analysis system 180 is a packaged functional hardware unit designed for use with other components/ systems. In another example, the relocation analysis system 180 is a portion of a program code (e.g., software or firmware) executable by a processor, processing circuitry and/or the controller 150. In yet another example, the relocation analysis system 180 is a self-contained hardware and/or software component that interfaces with other components and/or systems. Although the relocation analysis system 180 is shown as being part of the controller 150, the relocation analysis system 180 may be separate from the controller 150.

The relocation analysis system 180 identifies one or more memory blocks (e.g., memory block 225, memory block 230, memory block 235, memory block 240 (FIG. 2)), or a pool of memory blocks, that may be selected for, or otherwise included with, a relocation operation. In an example, the memory blocks that are included in the pool of memory blocks have been identified as candidates for the relocation operation using any suitable process. For example, the memory blocks that are selected or are otherwise identified as being candidates for the relocation operation are memory blocks that have a validity count under a particular threshold.

When the memory blocks have been identified, the relocation analysis system 180 identifies or determines a commit time associated with each memory block. As previously described, relocation operations typically have two phases—a read/write phase and a commit phase. In the read/write phase, data is read from a source memory block and written to a destination or target memory block. In the commit phase, the GAT page or entry associated with the data is updated. The commit time of the commit phase depends, at least in part, on the number of entries that are being added to a queue.

When the commit time of each memory block has been determined, the relocation analysis system 180 determines which memory blocks to use for the relocation operation. In some examples, the relocation analysis system 180 will choose a memory block with a higher validity count when compared with a memory block having a lower validity count if the commit time associated with the memory block having the higher validity count is lower than the commit time of the memory block having the lower validity count.

However, in some examples, the difference in the validity count between the memory blocks needs to be within a validity count threshold. For example, if validity count of a first memory block is five percent higher than a validity count for a second memory block, but the first memory block has a lower commit time, the first memory block is selected. However, if the validity count of the first memory block is ten percent higher than the validity count of the second memory block (and the validity count threshold is ten percent), the second memory block is selected, even though the commit time of the second memory block is higher than the commit time of the first memory block.

Once the commit time and/or the validity count for each memory block in the pool of memory blocks has been determined, the relocation analysis system 180 performs the relocation operation on the selected one or more memory blocks.

Figure 3:
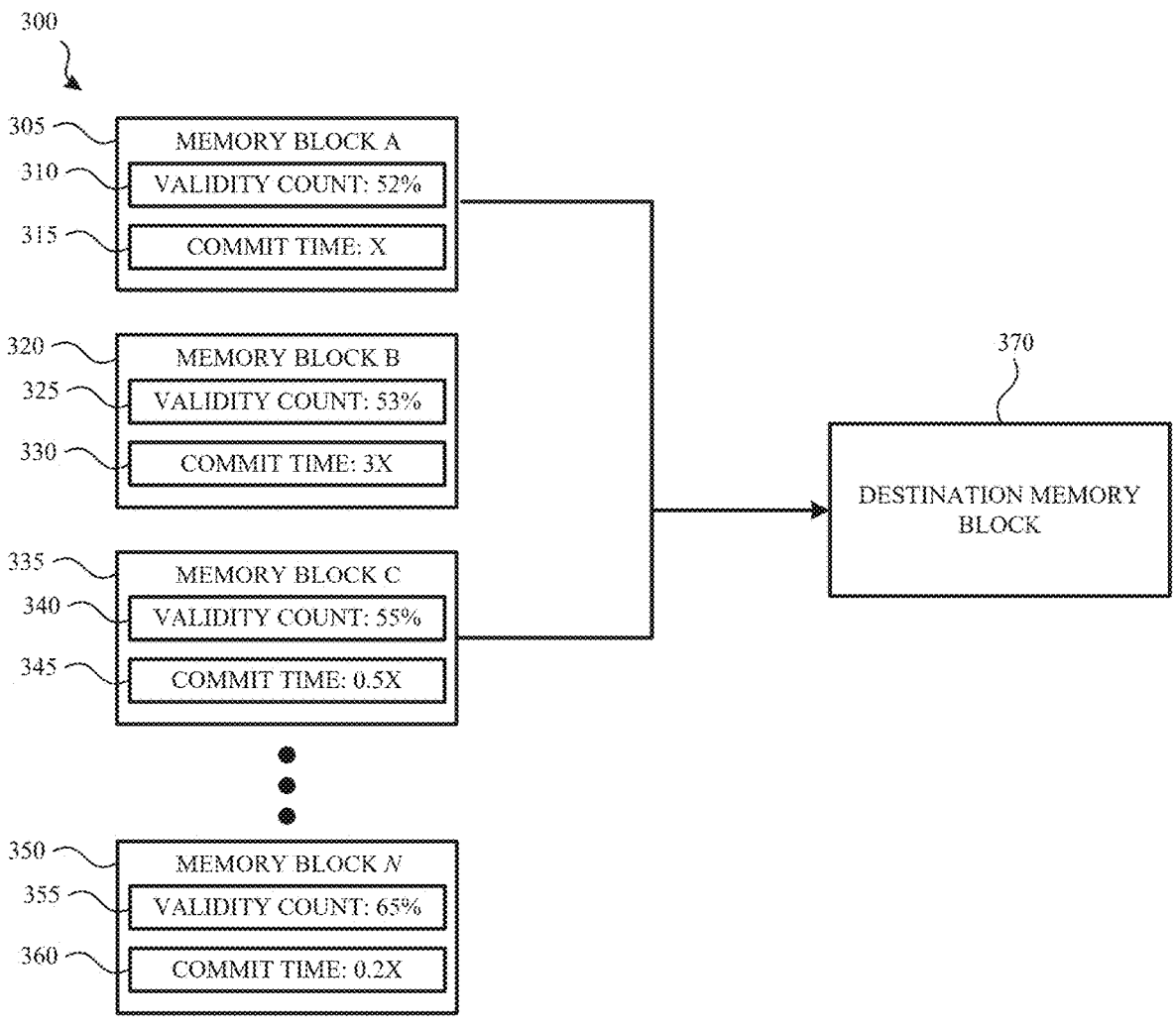
FIG. 3 illustrates a pool of memory blocks that may be selected for a relocation operation according to an example.

For example and referring to FIG. 3, FIG. 3 illustrates a pool of memory blocks 300 that may be selected for a relocation operation according to an example. In an example, the pool of memory blocks 300 includes N memory blocks. For example, the pool of memory blocks 300 includes Memory Block A 305, Memory Block B 320, Memory Block C 335 and Memory Block N 350.

Each of the memory blocks in the pool of memory blocks 300 was identified, by a controller and/or a relocation analysis system (e.g., the relocation analysis system 180 FIG. 1)) as a candidate for a relocation operation based on one or more factors (e.g., a validity count). Further, each memory block in the pool of memory blocks 300 may be part of one or more memory dies (e.g., the first memory die 165 and/or the second memory die 170 (FIG. 1)).

Each memory block in the pool of memory blocks 300 has or is associated with a validity count and a commit time. For example, Memory Block A 305 has a validity count 310 of 52% and a commit time 315 of X (where X is any value greater than zero); Memory Block B 320 has a validity count 325 of 53% and a commit time 330 of 3x; Memory block C 335 has a validity count 340 of 55% and a commit time of 0.5x; and Memory Block N 350 has a validity count 355 of 65% and a commit time 360 of 0.2x. Although specific values are given, these are for example purposes only.

In conventional relocation operations, the memory blocks that would be selected from the pool of memory blocks 300 are those with the lowest validity counts (commit time is not considered). For example, in conventional relocation operations, Memory Block A 305 and Memory Block B 320 would be selected for the relocation operation because they have the lowest validity counts (e.g., 52% and 53% respectively). However, in this example Memory Block B 320 has a commit time 330 of 3x. Because the commit time of Memory Block B 320 is considerably high when compared with the other memory blocks in the pool of memory blocks, one or more received host writes and/or any additional writes associated with the relocation operation may be delayed.

To address this and as previously described, the relocation analysis system selects memory blocks from the pool of memory blocks 300 based solely on the commit time. In another example, the relocation analysis system selects memory blocks from the pool of memory blocks 300, at least in part, on the commit time (e.g., based on the validity count and the commit time). For example, the relocation analysis system would select Memory Block A 305 and Memory Block C 335 for the relocation operation based on the validity count of each memory block and based on the commit time of each memory block.

For example, the relocation analysis system selects Memory Block A 305 because it has the lowest validity count (e.g., validity count 310 of 52%) and one of the lower commit times (e.g., a commit time 315 of X). Additionally, the relocation analysis system would select Memory Block C 335 for the relocation operation because Memory Block C 335 has a lower commit time (e.g., a commit time 345 of 0.5×) when compared with Memory Block B 320, even though Memory Block B 320 has a lower validity count 325.

When the relocation analysis system has selected these memory blocks, the relocation analysis system initiates or performs a relocation operation in which valid data from Memory Block A 305 and valid data from Memory Block C 335 is relocated to a destination memory block 370. Although data from two memory blocks is shown as being relocated to the destination memory block 370, it is contemplated that data from fewer than two memory blocks, or data from more than two memory blocks, may be relocated to the destination memory block 370.

In this example and as previously described, Memory Block N 350 has the lowest commit time of all the memory blocks. For example, Memory Block N 350 has a commit time 360 of 0.2×. However, in some examples, the relocation analysis system would not select Memory Block N 350 because Memory Block N 350 has a validity count 355 of 65%. In other examples, the relocation analysis system may determine whether the lower commit time offsets the higher validity count. If the relocation analysis system determines the lower commit time would offset the higher validity count, Memory Block N 350 may be selected.

However, in this example, the memory block with the lower validity count will be selected. Thus, when comparing the validity count of Memory Block N 350 to the memory block with next lowest validity count (e.g., the validity count of Memory Block B 320, because Memory Block A 305 has already been selected) in the pool of memory blocks 300, the relocation analysis system determines that the difference in validity counts (e.g., a difference of 12%) is over a validity count threshold (e.g., a validity count threshold of 10%).

Because the difference in validity counts is over the validity count threshold, any tradeoffs between commit time and validity count may be negated. For example, any time savings that may occur based on the commit time would not make up for the amount of time it would take to relocate an extra 12% of data from Memory Block N 350 when compared with Memory Block B 320.

In other examples, memory blocks may be selected based on the commit time, the validity count or a combination of the validity count and commit time. Additionally, although a validity count threshold of 10% is discussed, the validity count threshold may have any value and may be based on a number of factors. In an example, these factors include, but are not limited to, a level of device overprovisioning, a total TeraByte Written (TBW) the data storage device needs to support, the amount of resources available to perform a relocation operation and so on. In some examples, if the difference in validity count is above the validity count threshold, the memory block will not be considered for the relocation operation.

Referring back to FIG. 1, in an example, the relocation analysis system 180 also identifies, determines and/or calculates the commit time of various memory blocks in the memory device 155. In an example, the commit time is determined during a memory block selection process in which one or more memory blocks in the pool of memory blocks (e.g., the pool of memory blocks 300 (FIG. 3)) is selected for the relocation process. In another example, the relocation analysis system 180 periodically calculates or determines the commit time of each memory block. In yet another example, the relocation analysis system 180 continuously calculates or determines the commit time of each memory block.

In an example, the commit time may be based on, or determined by, one or more factors. For example, the relocation analysis system 180 may determine a commit time (or determine whether memory blocks should be selected based on the commit time) depending on the type of data being stored by the data storage device 110.

For example, if the data storage device 110 is storing video data, the commit time is the primary factor to be considered for a relocation operation to help ensure a minimum write performance is maintained. In another example, the commit time is the primary factor to be considered for a relocation operation to help to help conserve power (e.g., when the data storage device 110 is part of a battery-operated computing device). In yet another example, the commit time is the primary factor to be considered for a relocation operation to help avoid command timeouts. In still yet other example, the commit time is the primary factor to be considered for a relocation operation to help fast relocations while operating on a high-performance tenant in multi-tenant environment.

There are many ways in which the relocation analysis system 180 can determine a commit time of the various memory blocks. For example, the relocation analysis system 180 can determine or identify the number of random fragments and/or the number of sequential fragments in the memory block. In an example, a memory block with less randomness would cause less commit entries.

In another example, the relocation analysis system determines the number of different GAT pages or entries stored in each memory block and the commit time may be based on the number of GAT pages. For example, even if two memory blocks have random data, the commit time for a memory block having the same GAT pages would be smaller when compared with a memory block having different GAT pages as GAT delta evictions for the former memory block would be much more efficient when compared with the latter memory block.

Figure 4:
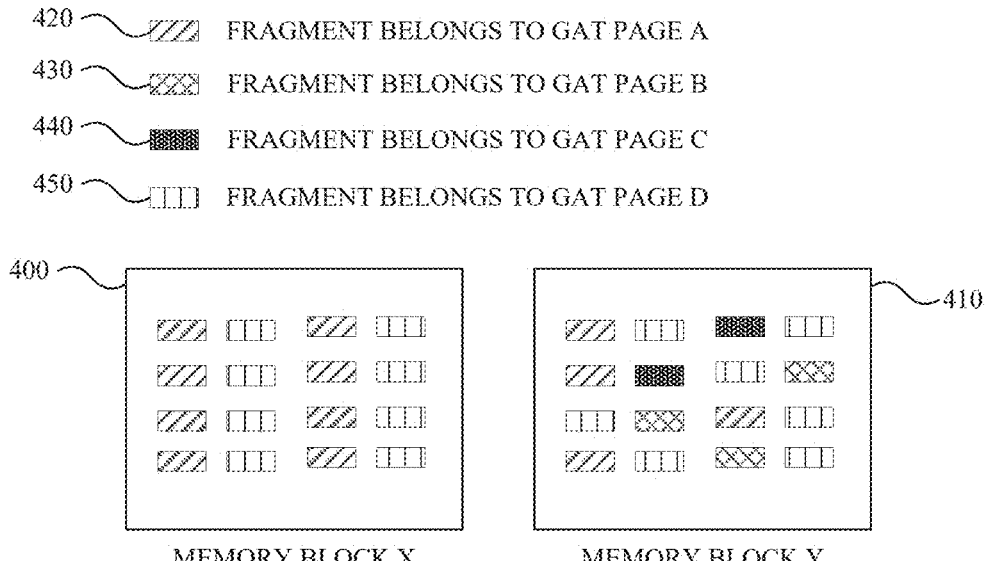
FIG. 4 illustrates two memory blocks in a pool of memory blocks having various random data fragments according to an example.

For example and referring to FIG. 4, FIG. 4 illustrates two memory blocks in a pool of memory blocks having various random data fragments according to an example. For example, each of Memory Block X 400 and Memory Block Y 410 may be part of the pool of memory blocks 300 shown and described with respect to FIG. 3. In this example, each memory block includes random data fragments (represented by the various patterns) that belong to different GAT pages.

For example, some of the random data fragments (represented by the first pattern 420) belong to GAT page A, some of the random data fragments (represented by the second pattern 430) belong to GAT page B, some of the random data fragments (represented by the third pattern 440) belong to GAT page C and some of the random data fragments (represented by the fourth pattern 450) belong to GAT page D. Although four GAT pages are represented, a memory block may have any number of data fragments from more than four GAT pages or fewer than four GAT pages.

In this example, both Memory Block X 400 and Memory Block Y includes random data and have the same validity count. However, Memory Block X 400 includes fewer different GAT pages when compared with Memory Block Y 410. For example, Memory Block X 400 includes random data from two different GAT pages (e.g., GAT page A and GAT page D) while Memory Block Y includes random data from four different GAT pages (e.g., GAT page A, GAT page B, GAT page C and GAT page D).

Thus, when determining a commit time of Memory Block X 400 and Memory Block Y 410, the relocation analysis system would determine that Memory Block X 400 has a lower commit time. As a result, Memory Block X 400 would be selected over Memory Block Y (presuming the validity counts of each memory block were within a threshold validity count of another memory block such as previously described).

Figure 5:
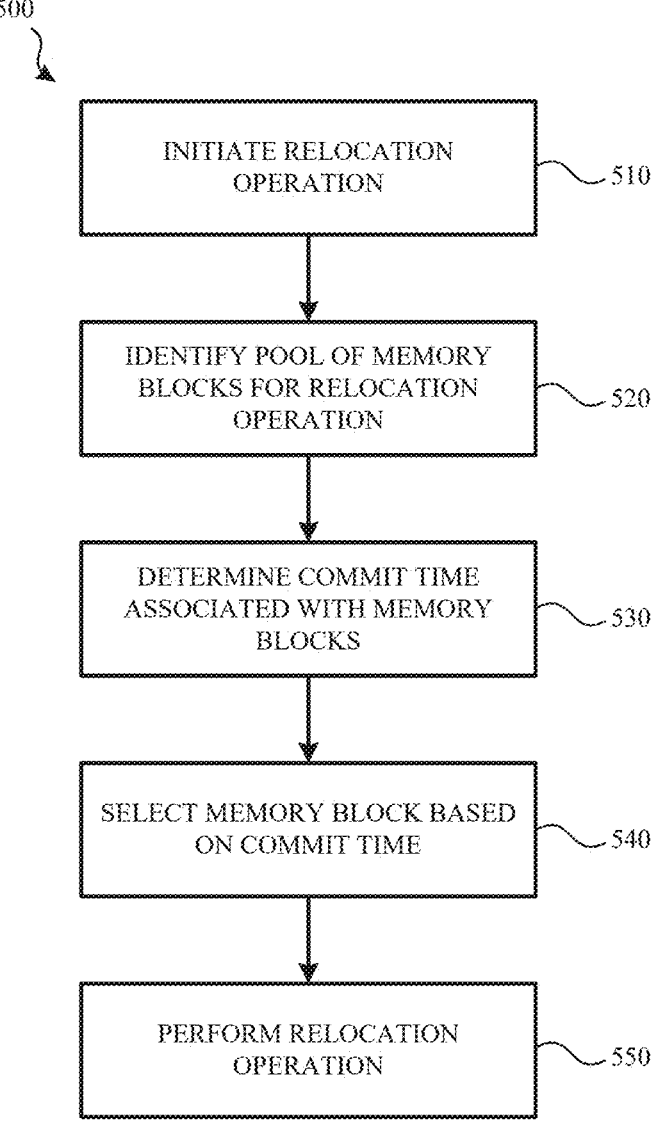
FIG. 5 illustrates a method for performing a relocation operation according to an example.

FIG. 5 illustrates a method 500 for performing a relocation operation according to an example. In an example, the method 500 may be performed by a relocation analysis system of a data storage device such as, for example, the relocation analysis system 180 shown and described with respect to FIG. 1.

In an example, the method 500 begins when the relocation analysis system initiates (510) a relocation operation. In an example, the relocation analysis system initiates a relocation operation in response to a command received from a controller, from a host device, as part of a garbage collection operation and/or in response to a determination that a relocation operation is to be performed.

The relocation analysis system then identifies (520) a pool of memory blocks for the relocation operation. In an example, the memory blocks in the pool of memory blocks are included in the pool based, at least in part, on a determined validity count. For example, the memory blocks are included in the pool of memory blocks if the memory blocks have a validity count under a threshold. In an example, the memory blocks may be added to, or otherwise associated with the pool of memory blocks using any suitable method including wear leveling operations.

When the pool of memory blocks has been identified, the relocation analysis system determines (530) a commit time associated with each memory block. In an example, the commit time is determined when the memory block is added to the pool of memory blocks. In another example, the commit time is determined when the relocation operation is initiated. In yet another example, the commit time is periodically or continuously updated.

Based, at least in part, on determining the commit time, the relocation analysis system selects (540) one or more memory blocks based, at least in part, on the commit time. In some examples, and depending on the type of data being stored and/or on the type of computing device that is using a data storage device that includes the memory blocks, commit time may be the only factor in determining which memory blocks should be included in the relocation operation. In another example, the commit time and a validity count associated with each memory block is used to determine whether the memory block will be selected for the relocation operation.

When the memory blocks have been selected, the relocation analysis system performs (550) the relocation operation using the selected memory blocks.

Figures 6, 7:
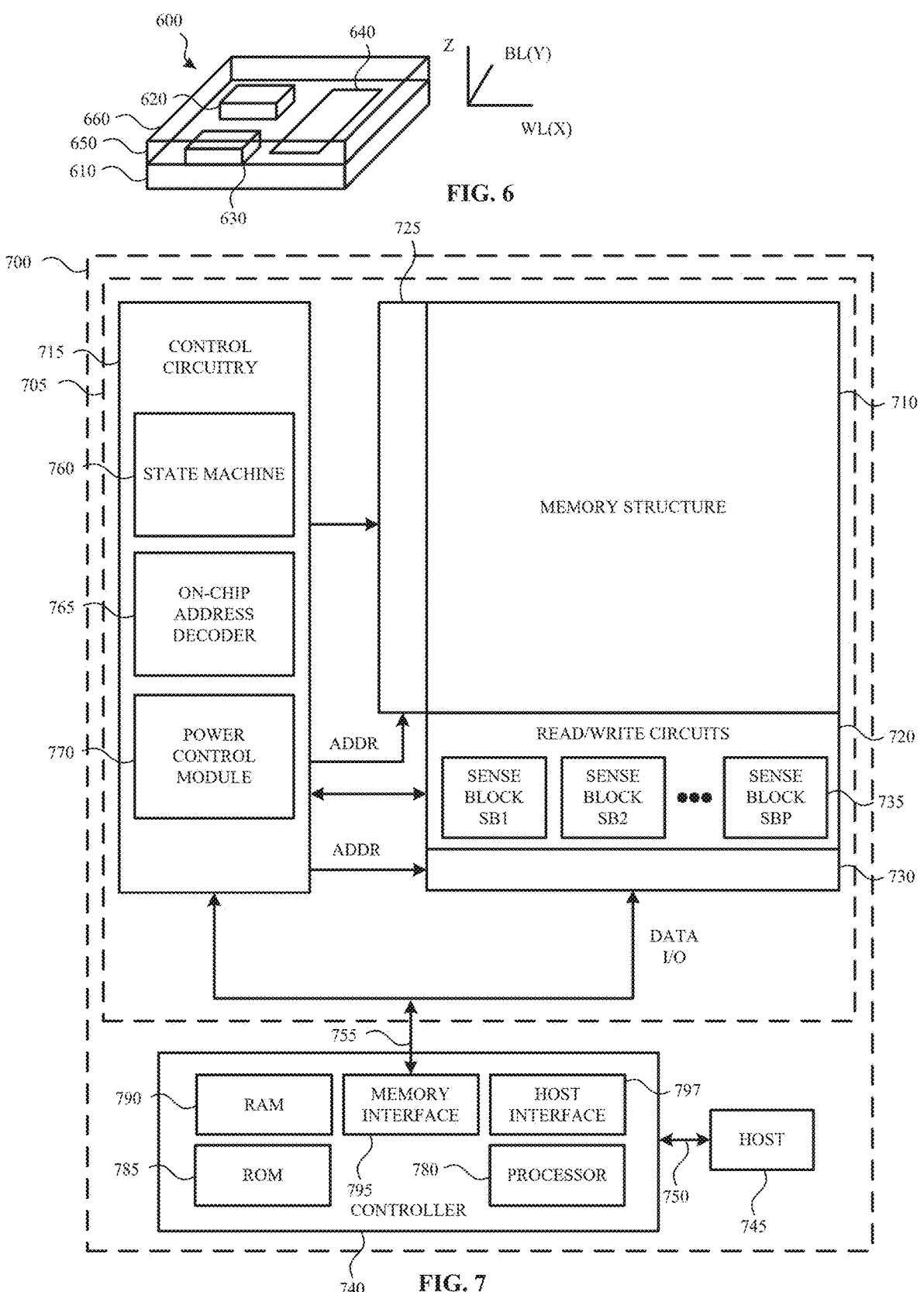
FIG. 6 is a perspective view of a storage device that includes three-dimensional (3D) stacked non-volatile memory according to an example.
FIG. 7 is a block diagram of a data storage device according to an example.

FIG. 6-FIG. 7 describe example storage devices that may be used with or otherwise implement the various features described herein. For example, the storage devices shown and described with respect to FIG. 6-FIG. 7 may include various systems and components that are similar to the systems and components shown and described with respect to FIG. 1. For example, the controller 740 shown and described with respect to FIG. 7 may be similar to the controller 150 of FIG. 1. Likewise, the memory dies 705 may be similar to the first memory die 165 and/or the second memory die 170 of FIG. 1.

FIG. 6 is a perspective view of a storage device 600 that includes three-dimensional (3D) stacked non-volatile memory according to an example. In this example, the storage device 600 includes a substrate 610. Blocks of memory cells are included on or above the substrate 610. The blocks include a first block (BLK0 620) and a second block (BLK1 630). Each block is formed of memory cells (e.g., non-volatile memory elements). The substrate 610 also includes a peripheral area 640 having support circuits that are used by the first block and the second block.

The substrate 610 also carries circuits under the blocks, along with one or more lower metal layers which are patterned in conductive paths to carry signals from the circuits. In an example, the blocks are formed in an intermediate region 650 of the storage device 600. The storage device also includes an upper region 660. The upper region 660 includes one or more upper metal layers that are patterned in conductive paths to carry signals from the circuits. Each block of memory cells includes a stacked area of memory cells. In an example, alternating levels of the stack represent wordlines. While two blocks are depicted, additional blocks may be used and extend in the x-direction and/or the y-direction.

In an example, a length of a plane of the substrate 610 in the x-direction represents a direction in which signal paths for wordlines or control gate lines extend (e.g., a wordline or drain-end select gate (SGD) line direction) and the width of the plane of the substrate 610 in the y-direction represents a direction in which signal paths for bit lines extend (e.g., a bit line direction). The z-direction represents a height of the storage device 600.

FIG. 7 is a block diagram of a data storage device 700 according to an example. In an example, the storage device 700 is similar to the 3D stacked non-volatile storage device 600 shown and described with respect to FIG. 6. In an example, the components depicted in FIG. 7 are electrical circuits. In an example, the storage device 700 includes one or more memory dies 705. Each memory die 705 includes a three-dimensional memory structure 710 of memory cells (e.g., a 3D array of memory cells), control circuitry 715, and read/write circuits 720. In another example, a two-dimensional array of memory cells may be used. The memory structure 710 is addressable by wordlines using a first decoder 725 (e.g., a row decoder) and by bit lines using a second decoder 730 (e.g., a column decoder). The read/write circuits 720 may also include multiple sense blocks 735 including SB1, SB2, . . . , SBp (e.g., sensing circuitry) which allow pages of the memory cells to be read or programmed in parallel. The sense blocks 735 may include bit line drivers.

In an example, a controller 740 is included in the same storage device 700 as the one or more memory dies 705. In another example, the controller 740 is formed on a die that is bonded to a memory die 705, in which case each memory die 705 may have its own controller 740. In yet another example, a controller die controls all of the memory dies 705. Although a single controller 740 is shown, the storage device 700 can include multiple controllers with each controller responsible for different operations described herein.

Commands and data are transferred between a host 745 and the controller 740 using a data bus 750. Additionally, commands and data are transferred between the controller 740 and one or more of the memory dies 705 by way of lines 755. In one example, the memory die 705 includes a set of input and/or output (I/O) pins that connect to lines 755.

The memory structure 710 also includes one or more arrays of memory cells. The memory cells are arranged in a three-dimensional array or a two-dimensional array. The memory structure 710 includes any type of non-volatile memory that is formed on one or more physical levels of arrays of memory cells having an active area disposed above a silicon substrate. The memory structure 710 may be in a non-volatile memory device having circuitry associated with the operation of the memory cells, whether the associated circuitry is above or within the substrate.

The control circuitry 715 works in conjunction with the read/write circuits 720 to perform memory operations (e.g., erase, program, read, and others) on the memory structure 710. The control circuitry 715 may include registers, ROM fuses, and other devices for storing default values such as base voltages and other parameters.

The control circuitry 715 also includes a state machine 760, an on-chip address decoder 765 and a power control module. The state machine 760 provides chip-level control of various memory operations, such as selecting a memory block for programming. The state machine 760 is programmable by software. In another example, the state machine 760 does not use software and is completely implemented in hardware (e.g., electrical circuits).

The on-chip address decoder 765 provides an address interface between addresses used by host 745 and/or the controller 740 to a hardware address used by the first decoder 725 and the second decoder 730. The power control module 770 controls power and voltages that are supplied to the wordlines and bit lines during memory operations. The power control module 770 may include drivers for wordline layers in a 3D configuration, select transistors (e.g., SGS and SGD transistors) and source lines. The power control module 770 may include one or more charge pumps for creating voltages. In an example, the power control module 770 helps ensure wordlines of the grown bad block described herein are programmed at the desired levels.

The control circuitry 715, the state machine 760, the on-chip address decoder 765, the first decoder 725, the second decoder 730, the power control module 770, the sense blocks 735, the read/write circuits 720, and/or the controller 740 may be considered one or more control circuits and/or a managing circuit that perform some or all of the operations described herein.

In an example, the controller 740, is an electrical circuit that may be on-chip or off-chip. Additionally, the controller 740 may include one or more processors 780, ROM 785, RAM 790, memory interface 795, and host interface 797, all of which may be interconnected. In an example, the one or more processors 780 is one example of a control circuit. Other examples can use state machines or other custom circuits designed to perform one or more functions. Devices such as ROM 785 and RAM 790 may include code such as a set of instructions. One or more of the processors 780 may be operable to execute the set of instructions to provide some or all of the functionality described herein.

Alternatively or additionally, one or more of the processors 780 may access code from a memory device in the memory structure 710, such as a reserved area of memory cells connected to one or more wordlines. The memory interface 795, in communication with ROM 785, RAM 790, and one or more of the processors 780, may be an electrical circuit that provides an electrical interface between the controller 740 and the memory die 705. For example, the memory interface 795 may change the format or timing of signals, provide a buffer, isolate from surges, latch I/O, and so forth.

The one or more processors 780 may issue commands to control circuitry 715, or any other component of memory die 705, using the memory interface 795. The host interface 797, in communication with the ROM 785, the RAM 795, and the one or more processors 780, may be an electrical circuit that provides an electrical interface between the controller 740 and the host 745. For example, the host interface 797 may change the format or timing of signals, provide a buffer, isolate from surges, latch I/O, and so on. Commands and data from the host 745 are received by the controller 740 by way of the host interface 797. Data sent to the host 745 may be transmitted using the data bus 750.

Multiple memory elements in the memory structure 710 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Based on the above, examples of the present disclosure describe a method, comprising: initiating a relocation operation in a data storage device; identifying a plurality of memory blocks for the relocation operation; determining a commit time associated with each memory block of the plurality of memory blocks; selecting at least one memory block of the plurality of memory blocks based, at least in part, on the commit time associated with the at least one memory block; and performing the relocation operation using the at least one memory block. In an example, the method also includes determining a validity count associated with each memory block of the plurality of memory blocks. In an example, selecting at least one memory block of the plurality of memory blocks further comprises: comparing the validity count of the at least one memory block to the validity count of another memory block of the plurality of memory blocks; and selecting the at least one memory block if a difference between the validity count of the least one memory block and the validity count of the another memory block is within a validity count difference threshold. In an example, determining the commit time associated with each memory block includes determining at least one of an amount of random data stored in each memory block and an amount of sequential data stored in each memory block. In an example, determining the commit time associated with each memory block includes determining a number of different group address table pages stored in each of the memory blocks. In an example, at least one memory block of the plurality of memory blocks is selected based, at least in part, on a type of data being stored by the data storage device. In an example, the at least one memory block of the plurality of memory blocks is selected based, at least in part, on a power source associated with the data storage device. In an example, the at least one memory block has a higher validity count when compared with a non-selected memory block of the plurality of memory blocks.

Examples also describe a data storage device, comprising: a controller; and a relocation analysis system associated with the controller and operable to: identify of pool of memory blocks for a relocation operation; determine a commit time associated with each memory block in the pool of memory blocks; determine a validity count associated with each memory block in the pool of memory blocks; select at least one memory block in the pool of memory blocks for the relocation operation based, at least in part, on the commit time associated with the at least one memory block and the validity count associated with the at least one memory block; and cause the relocation operation to be performed. In an example, the relocation analysis system selects the at least one memory block in the pool of memory blocks for the relocation operation when the validity count associated with the at least one memory block and the validity count associated with a non-selected memory block is within a validity count difference threshold. In an example, the relocation analysis system is further operable to determine at least one of an amount of random data stored in each memory block and an amount of sequential data stored in each memory block. In an example, determining the commit time associated with each memory block in the pool of memory blocks includes determining a number of different group address table pages stored in each of the memory blocks. In an example, the relocation analysis system selects the at least one memory block in the pool of memory blocks based, at least in part, on a type of data being stored by the data storage device. In an example, the relocation analysis system selects the at least one memory block in the pool of memory blocks based, at least in part, on a power source associated with the data storage device. In an example, the at least one memory block has a higher validity count when compared with a non-selected memory block of the pool of memory blocks.

Examples also describe a data storage device, comprising: means for identifying a pool of memory blocks for a relocation operation; means for determining a commit time associated with each memory block in the pool of memory blocks; means for selecting at least one memory block in the pool of memory blocks based, at least in part, on the commit time associated with the at least one memory block; and means for performing the relocation operation using the at least one memory block. In an example, the data storage device also includes means for determining a validity count associated with each memory block in the pool of memory blocks. In an example, the data storage device also includes means for comparing the validity count of the at least one memory block to the validity count of another memory block in the pool of memory blocks. In an example, the means for selecting the at least one memory block in the pool of memory blocks selects the at least one memory block if a difference between the validity count of the least one memory block and the validity count of the another memory block is within a validity count difference threshold. In an example, the data storage device also includes means for determining at least one of an amount of random data stored in each memory block and an amount of sequential data stored in each memory block.

One of ordinary skill in the art will recognize that the technology described herein is not limited to a single specific memory structure, but covers many relevant memory structures within the spirit and scope of the technology as described herein and as understood by one of ordinary skill in the art.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this disclosure that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
initiating a relocation operation in a data storage device;
identifying a plurality of memory blocks for the relocation operation;
determining a commit time associated with each memory block of the plurality of memory blocks;
selecting at least one memory block of the plurality of memory blocks based, at least in part, on the commit time associated with the at least one memory block; and
performing the relocation operation using the at least one memory block.

2. The method of claim 1, further comprising determining a validity count associated with each memory block of the plurality of memory blocks.

3. The method of claim 2, wherein selecting at least one memory block of the plurality of memory blocks further comprises:
comparing the validity count of the at least one memory block to the validity count of another memory block of the plurality of memory blocks; and
selecting the at least one memory block if a difference between the validity count of the at least one memory block and the validity count of the another memory block is within a validity count difference threshold.

4. The method of claim 1, wherein determining the commit time associated with each memory block includes determining at least one of an amount of random data stored in each memory block and an amount of sequential data stored in each memory block.

5. The method of claim 1, wherein determining the commit time associated with each memory block includes determining a number of different group address table pages stored in each of the memory blocks.

6. The method of claim 1, wherein the at least one memory block of the plurality of memory blocks is selected based, at least in part, on a type of data being stored by the data storage device.

7. The method of claim 1, wherein the at least one memory block of the plurality of memory blocks is selected based, at least in part, on a power source associated with the data storage device.

8. The method of claim 1, wherein the at least one memory block has a higher validity count when compared with a non-selected memory block of the plurality of memory blocks.

9. A data storage device, comprising:
a controller; and
a relocation analysis system associated with the controller and operable to:
identify a pool of memory blocks for a relocation operation;
determine a commit time associated with each memory block in the pool of memory blocks;
determine a validity count associated with each memory block in the pool of memory blocks;
select at least one memory block in the pool of memory blocks for the relocation operation based, at least in part, on the commit time associated with the at least one memory block and the validity count associated with the at least one memory block; and
cause the relocation operation to be performed.

10. The data storage device of claim 9, wherein the relocation analysis system selects the at least one memory block in the pool of memory blocks for the relocation operation when a difference between the validity count associated with the at least one memory block and the validity count associated with a non-selected memory block is within a validity count difference threshold.

11. The data storage device of claim 9, wherein the relocation analysis system is further operable to determine at least one of an amount of random data stored in each memory block and an amount of sequential data stored in each memory block.

12. The data storage device of claim 9, wherein determining the commit time associated with each memory block in the pool of memory blocks includes determining a number of different group address table pages stored in each of the memory blocks.

13. The data storage device of claim 9, wherein the relocation analysis system selects the at least one memory block in the pool of memory blocks based, at least in part, on a type of data being stored by the data storage device.

14. The data storage device of claim 9, wherein the relocation analysis system selects the at least one memory block in the pool of memory blocks based, at least in part, on a power source associated with the data storage device.

15. The data storage device of claim 9, wherein the at least one memory block has a higher validity count when compared with a non-selected memory block of the pool of memory blocks.

16. A data storage device, comprising:
means for identifying a pool of memory blocks for a relocation operation;
means for determining a commit time associated with each memory block in the pool of memory blocks;
means for selecting at least one memory block in the pool of memory blocks based, at least in part, on the commit time associated with the at least one memory block; and
means for performing the relocation operation using the at least one memory block.

17. The data storage device of claim 16, further comprising means for determining a validity count associated with each memory block in the pool of memory blocks.

18. The data storage device of claim 17, further comprising means for comparing the validity count of the at least one memory block to the validity count of another memory block in the pool of memory blocks.

19. The data storage device of claim 18, wherein the means for selecting the at least one memory block in the pool of memory blocks selects the at least one memory block if a difference between the validity count of the at least one memory block and the validity count of the another memory block is within a validity count difference threshold.

20. The data storage device of claim 16, further comprising means for determining at least one of an amount of random data stored in each memory block and an amount of sequential data stored in each memory block.

\* \* \* \* \*